US012613489B2

(12) United States Patent
Hamada et al.

(10) Patent No.: US 12,613,489 B2
(45) Date of Patent: Apr. 28, 2026

(54) IMAGE FORMING APPARATUS

(71) Applicant: CANON KABUSHIKI KAISHA, Tokyo (JP)

(72) Inventors: Mikihiko Hamada, Kanagawa (JP); Shuichi Tetsuno, Kanagawa (JP); Toshihiko Takayama, Kanagawa (JP); Hiroko Katagiri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 18/654,074

(22) Filed: May 3, 2024

(65) Prior Publication Data

US 2024/0385564 A1 Nov. 21, 2024

(30) Foreign Application Priority Data

May 15, 2023 (JP) ................................ 2023-080309
Apr. 11, 2024 (JP) ................................ 2024-064248

(51) Int. Cl.

*G03G 21/00* (2006.01)
*A46B 9/02* (2006.01)
*A46D 1/00* (2006.01)
*G03G 15/16* (2006.01)

(52) U.S. Cl.

CPC ........... *G03G 21/0035* (2013.01); *A46B 9/02* (2013.01); *A46D 1/0207* (2013.01); *G03G 15/1605* (2013.01); *G03G 21/0005* (2013.01); *G03G 21/0064* (2013.01); *G03G 21/007* (2013.01); *G03G 21/0076* (2013.01)

(58) Field of Classification Search

CPC ........... G03G 15/1605; G03G 21/0005; G03G 21/0035; G03G 21/0076; G03G 21/0064; G03G 21/007; A46B 9/02; A46D 1/0207
See application file for complete search history.

(56) References Cited

U.S. PATENT DOCUMENTS 11,526,116 B2 12/2022 Funatani
11,703,775 B2 7/2023 Kobayashi
11,782,377 B2 10/2023 Tetsuno
11,815,827 B2 11/2023 Hara
11,841,669 B2 12/2023 Funatani
11,994,823 B2 5/2024 Ito
(Continued)

FOREIGN PATENT DOCUMENTS

JP 2006-336141 A 12/2006
JP 2006-336142 A 12/2006
(Continued)

*Primary Examiner* — Joseph S Wong
(74) *Attorney, Agent, or Firm* — Venable LLP

(57) ABSTRACT

An image forming apparatus includes an image bearing member, a charging unit, a developing unit, a transfer unit, and a brush member arranged to be in contact with the image bearing member at a position downstream of a transfer portion and upstream of a charging portion in a direction of rotation of the image bearing member. The brush member includes a base body and a filament portion that is supported by the base body and that is configured to come into contact with the image bearing member. 50% or more of filaments of the filament portion are crimped yarn. The filaments of the crimped yarn are arranged in a dispersed manner over an entire range of the filament portion in the direction of rotation of the image bearing member.

16 Claims, 8 Drawing Sheets

(56) References Cited

U.S. PATENT DOCUMENTS

| | | | | |
|---|---|---|---|---|
| 2014/0356019 | A1* | 12/2014 | Toichi | G03G 21/0035 399/101 |
| 2018/0017900 | A1* | 1/2018 | Iwasawa | G03G 15/161 |
| 2021/0373461 | A1* | 12/2021 | Watanabe | G03G 21/0064 |
| 2022/0197207 | A1 | 6/2022 | Funatani | |
| 2023/0080995 | A1 | 3/2023 | Funatani | |
| 2023/0324825 | A1 | 10/2023 | Kobayashi | |
| 2023/0375971 | A1 | 11/2023 | Tetsuno | |
| 2024/0019796 | A1 | 1/2024 | Hara | |
| 2024/0069482 | A1 | 2/2024 | Funatani | |
| 2024/0272576 | A1 | 8/2024 | Ito | |

FOREIGN PATENT DOCUMENTS

| | | | |
|---|---|---|---|
| JP | 2008-076931 | A | 4/2008 |
| JP | 2008-116575 | A | 5/2008 |
| JP | 2022-096237 | A | 6/2022 |

* cited by examiner

IMAGE FORMING APPARATUS

BACKGROUND OF THE INVENTION

Field of the Invention

The preset invention relates to an image forming apparatus for forming images on recording materials.

Description of the Related Art

As an example of an image forming apparatus, a cleanerless system, i.e., simultaneous image developing and cleaning system, that collects transfer residual toner, that has not been transferred to a transfer object from an image bearing body, at a developing portion is proposed. In the cleanerless system, paper dust and filler adhered to a photosensitive drum at a transfer portion may affect subsequent processes. Japanese Patent Application Laid-Open Publication No. 2022-96237 discloses a configuration in which attached substances such as paper dust are collected by a brush member disposed to abut against a surface of a photosensitive drum.

However, splitting, i.e., filament bundle splitting, may occur at a filament portion of the brush member, such that paper dust accumulated in the brush member may locally leak out, according to which charging failures and image defects caused thereby may occur.

SUMMARY OF THE INVENTION

The present invention provides an image forming apparatus in which leakage of paper dust from the brush member is less likely to occur.

According to an aspect of the invention, an image forming apparatus includes an image bearing member configured to rotate, a charging unit configured to charge the image bearing member at a charging portion, a developing unit configured to develop an electrostatic latent image formed on the image bearing member into a toner image using toner at a developing portion, a transfer unit configured to transfer the toner image to a transfer material at a transfer portion, and a brush member arranged to be in contact with the image bearing member at a position downstream of the transfer portion and upstream of the charging portion in a direction of rotation of the image bearing member, wherein the image forming apparatus is configured such that residual toner that has not been transferred to the transfer material at the transfer portion is collected by the developing unit at the developing portion, wherein the brush member includes a base body and a filament portion that is supported by the base body and that is configured to come into contact with the image bearing member, wherein 50% or more of filaments of the filament portion are crimped yarn, and wherein the filaments of the crimped yarn are arranged in a dispersed manner over an entire range of the filament portion in the direction of rotation of the image bearing member.

According to another aspect of the invention, an image forming apparatus includes an image bearing member configured to rotate, a charging unit configured to charge the image bearing member at a charging portion, a developing unit configured to develop an electrostatic latent image formed on the image bearing member into a toner image using toner at a developing portion, a transfer unit configured to transfer the toner image to a transfer material at a transfer portion, and a brush member arranged to be in contact with the image bearing member at a position downstream of the transfer portion and upstream of the charging portion in a direction of rotation of the image bearing member, wherein the image forming apparatus is configured such that residual toner that has not been transferred to the transfer material at the transfer portion is collected by the developing unit at the developing portion, wherein the brush member includes a base body, and a filament portion that is supported by the base body and that is configured to come into contact with the image bearing member, wherein in a case where (i) one of end points of a curved line obtained by subjecting a filament of the filament portion to parallel projection from a predetermined direction is referred to as a starting point of the curved line, (ii) a length measured from the starting point to an arbitrary point p on the curved line along the curved line is referred to as variable x, and (iii) a distance between the point p and a straight line connecting both end points of the curved line is referred to as function $f(x)$ of x, 50% or more of filaments of the filament portion are each a filament of which the function $f(x)$ has an inflection point, and are arranged in a dispersed manner over an entire range of the filament portion in the direction of rotation of the image bearing member.

Further features of the present invention will become apparent from the following description of exemplary embodiments with reference to the attached drawings.

DESCRIPTION OF THE EMBODIMENTS

Embodiments according to the present disclosure will be described below with reference to the drawings.

First Embodiment

Figure 1:
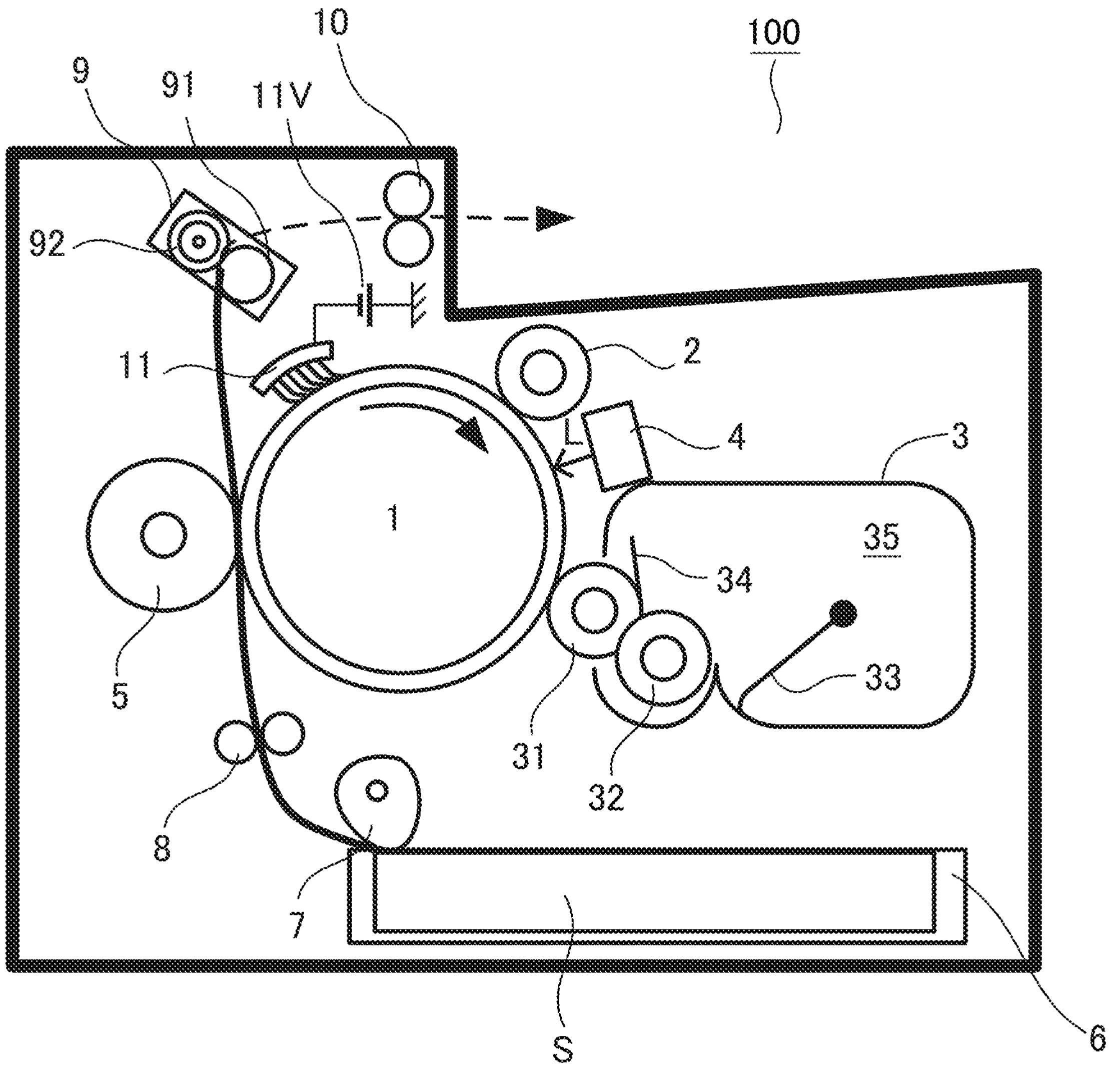
FIG. 1 is a schematic view of an image forming apparatus according to a first embodiment.

FIG. 1 is a schematic view of an image forming apparatus 100 according to a first embodiment. The image forming apparatus 100 according to the present embodiment is a monochromatic printer adopting an electrophotographic system.

The image forming apparatus 100 includes a photosensitive drum 1 serving as an image bearing member, a charging roller 2 serving as a charging unit, a developing apparatus 3 serving as a developing unit, an exposing apparatus 4 serving as an exposing unit, a transfer roller 5 serving as a transfer unit, and a brush member 11. The photosensitive drum 1 is a cylindrical photosensitive member. The charging roller 2, the developing apparatus 3, the exposing apparatus 4, the transfer roller 5, and the brush member 11 are arranged in a circumference of the photosensitive drum 1.

An opposing portion between the photosensitive drum 1 and the charging roller 2 is referred to as a charging portion. An opposing portion between the photosensitive drum 1 and a developing roller 31 of the developing apparatus 3 is referred to as a developing portion. The opposing portion between the photosensitive drum 1 and the transfer roller 5 is referred to as a transfer portion. The brush member 11 is in contact with a surface of the photosensitive drum 1 between the transfer portion and the charging portion in a direction of rotation of the photosensitive drum 1. The details of the brush member 11 will be described below.

The photosensitive drum 1 according to the present embodiment is an organic photosensitive member having negative chargeability. An outer diameter of the photosensitive drum 1 is 24 mm. The photosensitive drum 1 includes a drum-shaped base made of aluminum that is grounded electrically, and a photosensitive layer formed on the base. The photosensitive drum 1 is driven to rotate at a predetermined peripheral speed, i.e., processing speed, in a direction illustrated by the arrow in the drawing by a driving apparatus provided in the image forming apparatus 100.

The charging roller 2 is in contact with the photosensitive drum 1 with predetermined contact pressure. Desirable charging voltage is applied to the charging roller 2 by a charging high voltage power supply (not shown) serving as a charging voltage supplying unit. The exposing apparatus 4 is a laser scanner unit that scans a rotational axis direction of the photosensitive drum 1 using laser light, for example. The exposing apparatus 4 is not limited to a laser scanner unit, and an LED array in which a plurality of LEDs are aligned along a longitudinal direction of the photosensitive drum 1 may be adopted, for example.

The developing apparatus 3 includes the developing roller 31 serving as a developing member, i.e., developer bearing member, a toner supplying roller 32 serving as a developer supplying unit, a developer storage chamber 35 storing toner serving as developer, a developing blade 34, and an agitating and conveying member 33. Developing voltage is applied to the developing roller 31 from a developing high-voltage power supply (not shown) serving as a developing voltage applying unit. In the present embodiment, a contact development system/reversal development system is adopted as the development system. That is, toner borne on the developing roller 31 comes into contact with the photosensitive drum 1 at the developing portion. Further, in the developing portion, the value of developing voltage is set such that toner is transferred from the developing roller 31 to an exposure area of the photosensitive drum 1.

In the present embodiment, toner having a particle diameter of 6 μm and a normal polarity of negative polarity is used. According further to the present embodiment, a one-component nonmagnetic contact development system has been adopted, but alternatively, a two-component nonmagnetic contact/noncontact development system may be adopted, or a magnetic development system may be adopted.

An elastic roller having an outer circumference portion formed of an elastic material may be preferably used as the transfer roller 5. Examples of the elastic material include polyurethane rubber, ethylene-propylene-diene rubber (EPDM), and nitrile butadiene rubber (NBR). The transfer roller 5 is pressed toward the photosensitive drum 1 and is abutted against the photosensitive drum 1. A transfer high-voltage power supply not shown serving as a transfer voltage applying unit is connected to the transfer roller 5, and a predetermined transfer voltage is applied.

Further, the image forming apparatus 100 includes a cassette 6 serving as a sheet supporting portion, a feed roller 7 serving as a feeding unit, a conveyance roller pair 8 serving as a conveying unit, a fixing unit 9, and a discharge roller pair 10 serving as a discharging unit.

A sheet S is supported and stored in the cassette 6. Various sheet materials having different sizes and materials may be used as the sheet S serving as a recording material, or recording medium, including paper such as plain paper and thick paper, sheet materials subjected to surface treatment such as coated paper, sheet material having special shapes such as envelopes and index paper, plastic films, and cloths.

The fixing unit 9 is equipped with a configuration adopting a thermal fixing system. The fixing unit 9 according to the present embodiment is a film heating system including a fixing film 91, a pressing roller 92 opposed to the fixing film 91, and a heater disposed in an internal space of the fixing film 91 and heated by having current supplied thereto. A control unit of the image forming apparatus 100 performs energization control of the heater based on a detection result of a temperature detecting element attached to the heater, by which the fixing film 91 is maintained at a target temperature suitable for fixing images.

The flow of the image forming operation will be described. The image forming apparatus 100 starts an image forming operation when an image information has been entered from an external apparatus. When the image forming operation is started, the photosensitive drum 1 is driven to rotate, and the charging roller 2 charges a surface of the photosensitive drum 1 uniformly to a predetermined potential. According to the present embodiment, the photosensitive drum 1 is charged to negative polarity by the charging roller 2. The exposing apparatus 4 irradiates the photosensitive drum 1 with light and exposes the same based on the image information, by which an electrostatic latent image is formed on the surface of the photosensitive drum 1.

The developing apparatus 3 uses toner serving as developer to develop the electrostatic latent image into a toner image. In the inner side of the developing apparatus 3, the agitating and conveying member 33 agitates toner within the developer storage chamber 35, and conveys toner toward the developing roller 31 and the toner supplying roller 32. The developing roller 31 bears toner supplied from the toner supplying roller 32 and rotates, and conveys the toner to the developing portion. The developing blade 34 slides against the toner borne on the developing roller 31 to regulate the amount of toner on the surface of the developing roller 31 and to charge the toner by frictional charging. Then, in the developing portion, the charged toner particles are transferred from the developing roller 31 to the photosensitive drum 1 according to a potential distribution on the surface of the photosensitive drum 1, by which the electrostatic latent image is developed as a toner image. The toner image is conveyed from the developing portion to the transfer portion by rotation of the photosensitive drum 1.

At a matched timing with the reaching of the toner image formed on the photosensitive drum 1 to the transfer portion, the sheet S serving as a transfer material stored in the cassette 6 is conveyed by the feed roller 7 and the conveyance roller pair 8 to the transfer portion. Then, at the transfer portion, toner image is transferred from the photosensitive drum 1 to the sheet S.

The sheet S having passed through the transfer portion is conveyed to the fixing unit 9. The fixing unit 9 nips and conveys the sheet S at a nip portion, i.e., fixing nip, between the fixing film 91 and the pressing roller 92, while heating the toner image on the sheet S, by which the toner image is fixed to the sheet S. The sheet S having passed through the fixing unit 9 is discharged by the discharge roller pair 10 to an exterior of the image forming apparatus 100.

According to the image forming operation described above, transfer residual toner remaining on the photosensitive drum 1 without being transferred to the sheet S is collected by the following process. The image forming apparatus 100 according to the present embodiment adopts a system, i.e., a cleanerless system, or simultaneous image developing and cleaning system, in which transfer residual toner is collected at the developing portion and reused.

Transfer residual toner contains toner particles charged to positive polarity, i.e., abnormal polarity or reverse polarity, and toner particles that are charged to negative polarity but not charged sufficiently. After passing through a contact portion of the brush member 11, hereinafter referred to as brush contact portion, charge amount of negative polarity, i.e., normal polarity, of transfer residual toner is increased by discharge at the charging portion. Transfer residual toner charged at the charging portion reaches the developing portion along with the rotation of the photosensitive drum 1.

As described above, an electrostatic latent image is formed on the surface of the photosensitive drum 1 having reached the developing portion. Behavior of transfer residual toner having reached the developing portion is described in a manner classified into the following two cases, which are an exposure area, i.e., image area, and a non-exposure area, i.e., non-image area, of the photosensitive drum 1.

The value of developing voltage applied to the developing roller 31 is set such that, in the developing portion, a potential of the developing roller 31 is of the same polarity as the normal polarity of toner, that is, the developing roller 31 is on the negative polarity side, with respect to the potential of the exposure area of the photosensitive drum 1, i.e., light potential. Further, the value of developing voltage is set such that, in the developing portion, a potential of the developing roller 31 is of opposite polarity as the normal polarity of toner, that is, the developing roller 31 is on the positive polarity side, with respect to the potential of the non-exposure area of the photosensitive drum 1, i.e., dark potential.

Transfer residual toner adhered to a non-exposure area of the photosensitive drum 1 is transferred to the developing roller 31 due to a potential difference between a surface potential of the photosensitive drum 1 in the developing portion and the developing voltage, and collected in the developer storage chamber 35. Toner collected in the developer storage chamber 35 is agitated and uniformized with the toner within the developer storage chamber 35 by the agitating and conveying member 33, and reused for image formation.

Transfer residual toner adhered to the exposure area of the photosensitive drum 1 stays on the photosensitive drum 1 without being transferred to the developing roller 31 due to the potential difference between the surface potential of the photosensitive drum 1 in the developing portion and the developing voltage. In this case, transfer residual toner forms a toner image together with the toner transferred from the developing roller 31 to the photosensitive drum 1 at the developing portion. The toner image containing transfer residual toner is transferred to the sheet S at the transfer portion and removed from the photosensitive drum 1.

The image forming apparatus 100 according to the present embodiment does not include a cleaning member for collecting transfer residual toner into a waste toner container.

Brush Member

Next, the brush member 11 according to the present embodiment will be described. The brush member 11 functions as a paper dust removing member, i.e., collection member or catching member, for removing, i.e., collecting or catching, paper dust from the photosensitive drum 1. Further, the brush member 11 allows transfer residual toner to pass therethrough, such that transfer residual toner may be collected at the developing portion.

Figure 2A:
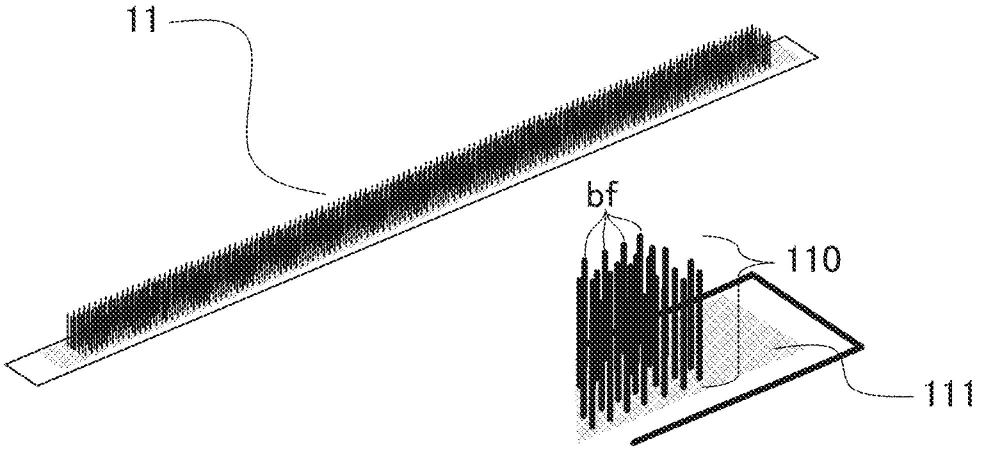
FIG. 2A is a perspective view of a brush member according to the first embodiment.
Figure 2B:
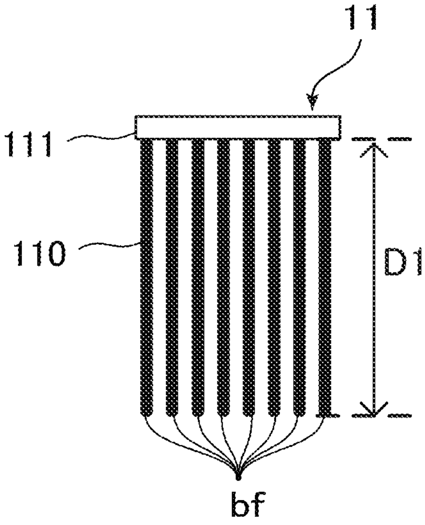
FIGS. 2B and 2C are each a schematic diagram of the brush member according to the first embodiment.
Figure 2C:
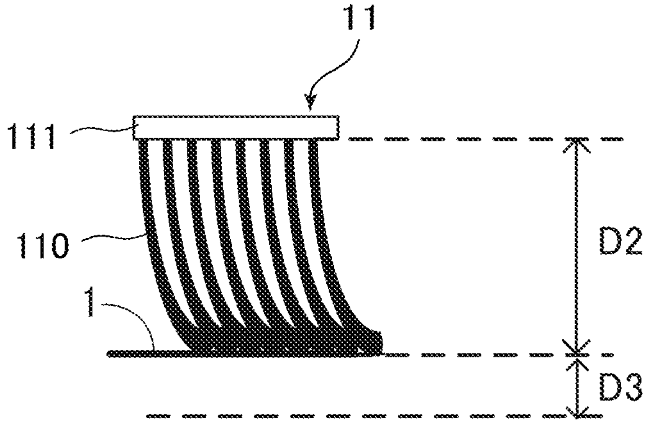

FIG. 2A is an overall perspective view of the brush member 11, and an enlarged view enlarging a part thereof, which is illustrated on the lower right side. FIG. 2B is a schematic diagram illustrating a state in which the brush member 11 prior to being attached to the image forming apparatus 100 is viewed in a longitudinal direction of the brush member 11 described below. FIG. 2C is a schematic diagram illustrating a state in which the brush member 11 attached to the image forming apparatus 100 is viewed in the longitudinal direction of the brush member 11. As illustrated in FIGS. 2A to 2C, the brush member 11 includes a base body 111, i.e., base portion or supporting portion, and a filament portion 110, i.e., bristle portion, hair portion or brush portion, that includes a number of brush filaments bf, i.e., bristle material (hair material) or brush bristle (brush hair), supported on the base body 111. In FIGS. 2A to 2C, the brush filaments bf are illustrated in straight lines for convenience, but according to the present embodiment, as described below, crimped yarn is utilized as the brush filaments bf.

Pile fabric in which the filament portion 110 is formed by pile yarn may be used as the brush member 11. In that case, the brush member 11 is formed, for example, by fabricating woven fabric in which filaments subjected to crimping treatment in advance are weaved in as pile yarn, and after cutting the loops of the pile yarn, dividing the woven fabric into predetermined sizes. In that case, the base fabric of woven fabric serves as the base body 111 of the brush member 11, and the pile yarn serves as the filament portion 110 of the brush member 11.

The brush member 11 is arranged to come into contact with the photosensitive drum 1 at a position downstream of the transfer portion and upstream of the charging portion in the direction of rotation of the photosensitive drum 1. The brush contact portion described above refers to a range in which the filament portion 110 of the brush member 11 comes into contact with the surface of the photosensitive drum 1. The brush member 11 is arranged such that a part of the filament portion 110 inroads the surface of the photosensitive drum 1.

An inroad amount D3 of the brush member 11 to the photosensitive drum 1 will be described with reference to FIGS. 2B and 2C. The inroad amount D3 is a difference (D1−D2) between a height D1 of the filament portion 110 before the brush member 11 is attached to the image forming apparatus 100 and a shortest distance D2 between the base body 111 and the photosensitive drum 1 in a state where the brush member 11 is attached to the image forming apparatus 100. The height D1 of the filament portion 110 is a projection height, i.e., bristle height, of the filament portion 110 with respect to the base body 111 in a state where the brush member 11 is not in contact with the photosensitive drum 1 etc., i.e., in a stand-alone state. The shortest distance D2 is a minimum value of a distance from a supporting surface, i.e., brush mounting seat surface, of the base body 111 in a supporting member to the surface of the photosensitive drum 1 when measured in a projecting direction of the filament portion 110 with respect to the base body 111, i.e., normal direction of the base body 111. The inroad amount is an amount illustrating a depth of abutment of the brush member 11 against the photosensitive drum 1.

The brush member 11 has the base body 111 thereof supported by a supporting member not shown, and is positioned with respect to the photosensitive drum 1. The supporting member is a member fixed to a casing of the image forming apparatus 100. That is, the brush member 11 is a fixed brush whose position of the base body 111 is fixed. Therefore, along with the rotation of the photosensitive drum 1, the filament portion 110 of the brush member 11 slides on the surface of the photosensitive drum 1. Alternatively, the supporting member that supports the brush member 11 may be a part of a process cartridge that is detachably attached to the casing of the image forming apparatus 100 and that is positioned with respect to the casing.

The brush member 11 catches or collects paper dust and other attached substances that have been transferred from the sheet S to the photosensitive drum 1 at the transfer portion, and thereby reduces the amount of paper dust that moves to the charging portion and the developing portion downstream of the brush member 11 in the direction of rotation of the photosensitive drum 1.

Brush voltage may be applied to the brush member 11 from a power supply 11V (FIG. 1) serving as a voltage applying unit, i.e., brush voltage applying unit, or voltage applying portion. The brush voltage is a voltage of the same polarity as the normal polarity of toner, which is negative polarity according to the present embodiment. In the present embodiment, a developing high-voltage power supply is also used as the power supply 11V or the brush voltage applying unit. That is, the same voltage as the developing voltage applied to the developing roller 31 is applied as the brush voltage to the brush member 11. The power supply 11V for applying brush voltage and the power supply for applying developing voltage may also be provided independently.

When toner particles charged to abnormal polarity pass through the brush contact portion and reach the charging portion, they are adhered to the charging roller 2 to which charging voltage of normal polarity is applied, possibly causing charging failures. By applying a brush voltage having a same polarity as the normal polarity of toner, the toner particles charged to abnormal polarity among the transfer residual toner having reached the brush contact portion may be caught by the filament portion 110, and the possibility of charging failures may be reduced. The brush member 11 allows toner particles charged to normal polarity and toner particles that are charged with normal polarity at the brush contact portion to pass through the brush contact portion.

Further, while the transfer residual toner passes through the brush contact portion, the brush member 11 may apply charge of normal polarity to the toner particles. Two methods for applying charge to the brush member 11 may be adopted, which are rolling of toner particles at the brush contact portion, and charge injection to toner particles. Application of charge by rolling of toner particles at the brush contact portion refers to application of charge by the toner particles rolling by coming into contact with brush filaments bf while the toner particles pass through the brush contact portion, by which the toner particles are charged by friction. Charge injection to toner particles refers to charge being injected to toner particles through the brush filaments bf by brush voltage when conductive filaments are used as the brush filaments bf. By applying charge of normal polarity to toner particles at the brush contact portion, the ratio of toner particles charged to abnormal polarity being the cause of charging failure and the ratio of toner particles charged insufficiently being the cause of image fogging may be reduced.

It may be possible to adopt a configuration in which brush voltage is not applied to the brush member 11. Even according to that case, toner particles may be charged by rolling of toner particles at the brush contact portion.

Conductive nylon filaments using nylon as binder material and having carbon mixed thereto as conductive material are adopted as the brush filaments bf according to the present embodiment. However, the material of the brush filaments bf is not limited thereto. Even if the binder material is polyester or acryl, for example, the material may be similarly used if conductivity is applied thereto. Further, the brush filaments bf may be filaments that do not have conductivity.

A short direction length of the brush member 11 according to the present embodiment is set to 5 mm. A short direction of the brush member 11 is a direction along a circumferential direction of the photosensitive drum 1. The short direction length of the brush member 11 is not limited to 5 mm. For example, as the short direction length of the brush member 11 elongates, the amount of paper duct that may be collected by the brush member 11 is increased, such that if the life of the image forming apparatus 100 or the process cartridge is long, the short direction length may be longer than 5 mm.

The height of the filament portion 110 of the brush member 11 according to the present embodiment is set to 5 mm. The height of the filament portion 110 refers to a projection amount of a tip the filament portion 110 from the base body 111 in a state prior to having the brush member 11 attached to the photosensitive drum 1. In the present embodiment, crimped yarn is used as the brush filaments bf, such that the height of the filament portion 110 differs from the lengths of the independent brush filaments bf. The height of the filament portion 110 of the brush member 11 is not limited to 5 mm.

The longitudinal length of the brush member 11 according to the present embodiment is set to 230 mm. The longitudinal direction of the brush member 11 refers to a rotational axis direction of the photosensitive drum 1. The short direction length of the brush member 11 is not limited to 230 mm. For example, the length in the longitudinal direction of the brush member 11 may be changed according to a longitudinal direction area through which a sheet S having a maximum width on which the image forming apparatus 100 may form an image passes, i.e., maximum sheet passing range. Paper dust occurs by contact between the photosensitive drum 1 and the sheet S, such that the longitudinal direction length of the brush member 11 is preferably equal to or greater than the width of the maximum sheet passing range.

Fineness of the brush filaments bf according to the present embodiment is set to 2 d (denier: g/9000 m), but is not limited thereto. However, if the fineness is too high, the stiffness of each filament may become strong, and the contact pressure to the photosensitive drum 1 is increased, such that the surface of the photosensitive drum 1 may be damaged by the filaments rubbing thereagainst. Therefore, the fineness may desirably be 1 d or more and 6 d or less, for example.

Further, "1 denier or greater and 6 denier or smaller" may be rephrased as "1.1 deci-tex or greater and 6.7 deci-tex or smaller". In the case of the brush filaments bf made of nylon used in the present embodiment, 1 d or greater and 6 d or smaller, which is based on a constant length type unit, may be converted into filament diameter, and brush filaments bf having a thickness of 5 μm or greater and 30 μm or smaller in filament diameter may be used.

Filament density of the brush filaments bf according to the present embodiment is set to 120 kF/inch$^2$, wherein "kF/inch$^2$" refers to the number of filaments per one square inch, but is not limited thereto. One square inch is approximately 645 mm$^2$, such that the unit of filament density may be converted based on the fact that 1 kF/inch$^2$ is equivalent to 645000 filaments/mm$^2$.

The inroad amount of the brush member 11 to the photosensitive drum 1 according to the present embodiment is 1.5 mm, but is not limited thereto. However, if the inroad amount is small, the possibility of paper dusts slipping therethrough is increased, such that the inroad amount should preferably be 1 mm or greater, for example.

Electrical resistivity of the brush member 11 according to the present embodiment is $1.0 \times 10^5 \Omega$ when measured in the following manner. That is, the brush member 11 is fixed in a state where the tip of the pile is inroaded for 1 mm in the pile length direction of the brush member 11 to the aluminum cylinder. The electrical resistivity of the brush member 11 is measured based on a current value when 50 V is applied to the brush member 11 in a state where the aluminum cylinder is rotated by 50 mm/sec. However, the electrical resistivity of the brush member 11 is not limited thereto, and for example, a brush having high resistivity of approximately $1.0 \times 10^8 \Omega$ may also be used.

In the filament portion 110 of the brush member 11 according to the present embodiment, 50% or more of the brush filaments bf in the number of filaments are crimped yarn, and the brush filaments bf of crimped yarn are arranged in a dispersed manner. Crimped yarn refers to a yarn subjected to crimping treatment.

The brush filaments bf formed of crimped yarn are dispersed over the entire range of the filament portion 110 in the short length direction. Suppose that crimped yarn is extremely unevenly distributed, wherein the brush filaments bf formed of crimped yarn are present only in an area of a part of the filament portion 110 in the short length direction, and brush filaments bf formed of crimped yarn are not present in other areas. In that case, in the area where the brush filaments bf formed of crimped yarn are not present, entanglement of brush filaments bf is not formed, and the effect of reducing filament bundle splitting described below is not achieved. Therefore, according to the present embodiment, the brush filaments bf of crimped yarn is arranged in a dispersed manner over the entire range of the filament portion 110 in the short length direction.

Further, preferably, the brush filaments bf of crimped yarn are dispersed over the entire range of the maximum sheet passing range in the longitudinal direction, more preferably, over the entire range of the filament portion 110 in the longitudinal direction. This is because if the brush filaments bf formed of crimped yarn are arranged only in a partial area of the filament portion 110 in the longitudinal direction, in the area where the brush filaments bf formed of crimped yarn are not present, the effect of reducing filament bundle splitting described below by the brush filaments bf formed of crimped yarn may not be achieved. However, the effect of reducing filament bundle splitting may be achieved in the area where the filament portion 110 is arranged in the longitudinal direction. Therefore, for example, if the area where paper dust tends to generate or the area where the leakage of paper dust tends to cause charging failure and image defects is recognized, it may be possible to arrange the brush filaments bf formed of crimped yarn only in the partial area of the filament portion 110 in the longitudinal direction.

The description "the brush filaments bf formed of crimped yarn are arranged in a dispersed manner" does not only refer to a case where the brush filaments bf of crimped yarn are dispersed one by one (i.e., in single filament unit), but also refers to a case where the ratio of number of brush filaments bf formed of crimped yarn to the total number of the brush filaments bf in a unit area is constant. For example, when creating the brush member 11 using pile fabric, a plurality of brush filaments bf protrude in a grouped (or bunched) manner from one area of the base body 111. In this case, not only a state where the brush filaments bf formed of crimped yarn are included in all groups but also an area where groups each including the brush filaments bf formed of crimped yarn are arranged regularly correspond to the area where the brush filaments bf formed of crimped yarn are arranged in a dispersed manner.

Figure 3:
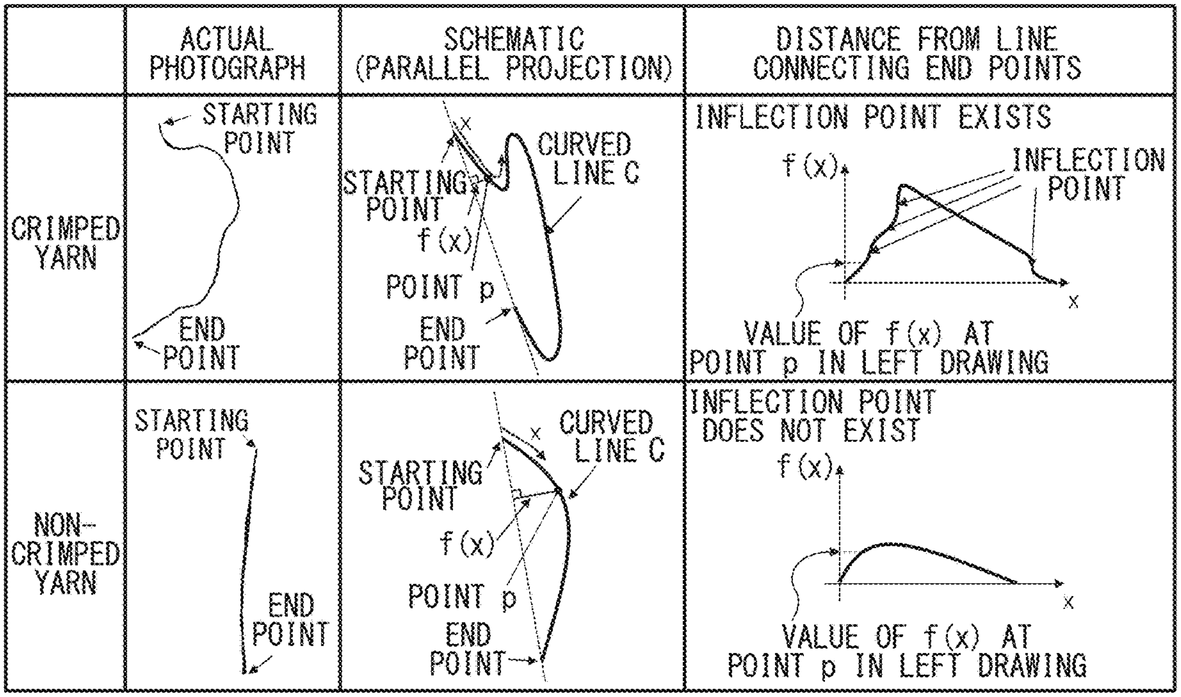
FIG. 3 is an explanatory view illustrating a method for discriminating crimped yarn.

Whether the brush filaments bf sampled from the brush member 11 are crimped yarn may be discriminated as described below. Whether one brush filament bf is crimped yarn is discriminated as illustrated in FIG. 3. A curved line obtained by performing parallel projection of the brush filament bf from a predetermined direction is defined as a curved line C. The predetermined direction is, for example, a direction just above, i.e., direction opposite to a gravity direction of, the brush filament bf placed on a horizontal surface. In this case, the curved line C is a shadow of the brush filament bf formed on the horizontal surface by parallel rays in the gravity direction.

One of the end points of the curved line C is defined as a starting point of the curved line C, and the other end point of the curved line C is defined as an end point of the curved line C. A length measured from the starting point of the curved line C to an arbitrary point p on the curved line C along the curved line C is set as a variable x, and a function $f(x)$ of x is defined as a distance between the point p and a straight line connecting both end points of the curved line C.

If the function $f(x)$ has an inflection point, the brush filament bf is defined as a crimped yarn. The function $f(x)$ may be sampled with a level of fineness that enables whether the brush filament bf may be discriminated as being a filament that has been subjected to crimping treatment. It is preferable to discriminate the presence or absence of an inflection point based on $f(x)$ that has been observed at a point when the entire length of the curved line C is equally divided by 100, for example, so as not to detect an inflection point based on an extremely short wavelength component of the curved line C.

In the brush member 11 according to the present embodiment, it is assumed that 50% or more of filaments of the filament portion 110 are discriminated as crimped yarn based on the discrimination method described above. It is also possible to have all the filaments of the filament portion 110 formed of crimped yarn.

Crimped yarn is created by subjecting raw yarn to a crimping treatment. The method of the crimping treatment is not limited, and for example, a false twisting processing method generally referred to as a disk friction false twisting method may be used. The disk friction false twisting method is a method in which heated raw yarn is made to come into contact with an outer circumference of a rotating disk, and the raw yarn is twisted by the frictional force between the disk and the raw yarn. In this state, by arbitrarily changing the raw yarn temperature or the feed rate of the raw yarn, the disk rotation speed, or the material of the outer circumference portion of the disk, level of crimping may be controlled. For example, filaments with a small level of crimping may be created by lowering the rotational speed of the disk.

With reference to FIG. 3, the difference between the brush filament bf formed of crimped yarn and the filament that is not formed of crimped yarn will be described. A left column of FIG. 3 illustrates photographs of an actual filament. A center column of FIG. 3 shows schematic diagrams in which parallel projections of filaments are shown in simplified form, and how the curved line C, the variable x, and the function $f(x)$ are acquired. The right column of FIG. 3 illustrates schematic views of graphs respectively illustrating x and $f(x)$ of the center column, with x shown on the horizontal axis and $f(x)$ shown on the vertical axis. The left column and the center column of FIG. 3 do not necessary illustrate the same filament.

When discriminating whether the brush filament bf corresponds to crimped yarn, at first, the brush filament bf is cut at the boundary between the base body 111 and the filament portion 110 and collected, and thereafter, observed using a microscope, for example. Further, since the shape of the brush filament bf may be varied gradually by sliding against the photosensitive drum 1, the observation of the brush filaments bf is performed in a state where the image forming apparatus 100 is new.

By using crimped yarn as the brush filaments bf, the brush filaments bf will be entangled with each other, such that the possibility of occurrence of filament bundle splitting of the filament portion 110 may be reduced. In the description, filament bundle splitting refers to a state in which a part of the filament portion 110 is split to one side and the other side in the longitudinal direction of the brush member 11, such that an area where the filament density is low is formed at a part of the filament portion 110. When filament bundle splitting occurs, collection failure of paper dust occurs locally, and charging failure and image defects caused thereby may occur.

According to the present embodiment, the filament portion 110 is less likely to spread in the longitudinal direction due to the brush filaments bf being entangled with each other, such that filament bundle splitting is less likely to occur.

Figure 5A:
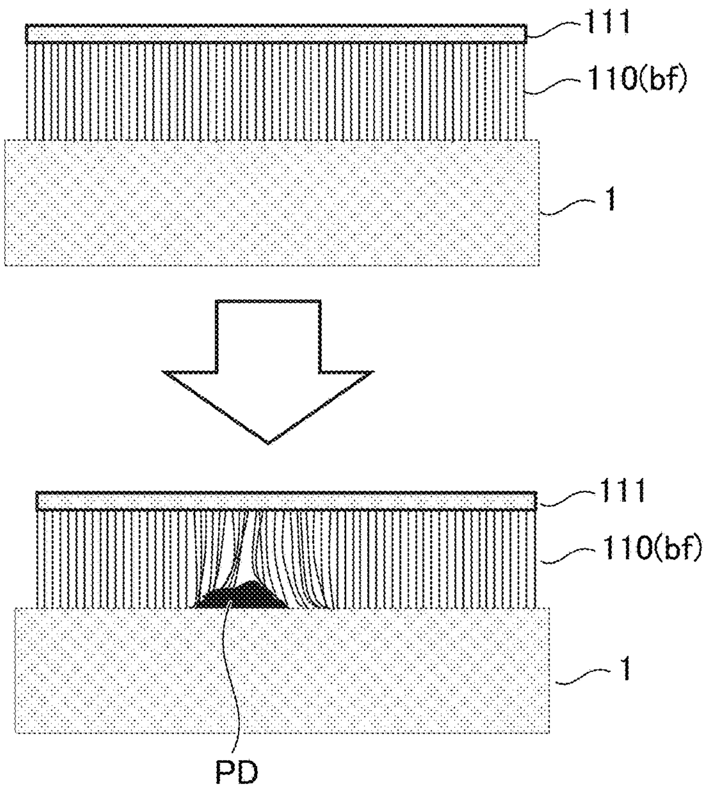
FIG. 5A is a view illustrating a behavior of a case where paper dust is accumulated in a brush member according to a reference example.

Specifically, in a cleanerless system configuration in which transfer residual toner is collected by the developing portion, the brush member 11 according to the present embodiment has a function to collect paper dust. Therefore, along with the increase of accumulated number of passed sheets, accumulated amount of paper dust by the brush member 11 is increased, and the accumulated paper dust may push the brush filaments bf to cause filament bundle splitting. FIG. 5A is a schematic view of a state in which filament bundle splitting of the filament portion 110 has occurred by accumulated paper dust PD. When filament bundle splitting occurs by accumulated paper dust, paper dust may leak out at once from the filament bundle splitting range, and a lump of paper dust may adhere to the charging roller 2. Then, by the adhesion of lump of paper dust to the charging roller 2, there is a risk that harmful effects may occur by paper dust at a side downstream of the brush contact portion, such as charging failure and the occurrence of image defects caused thereby.

Figure 5B:
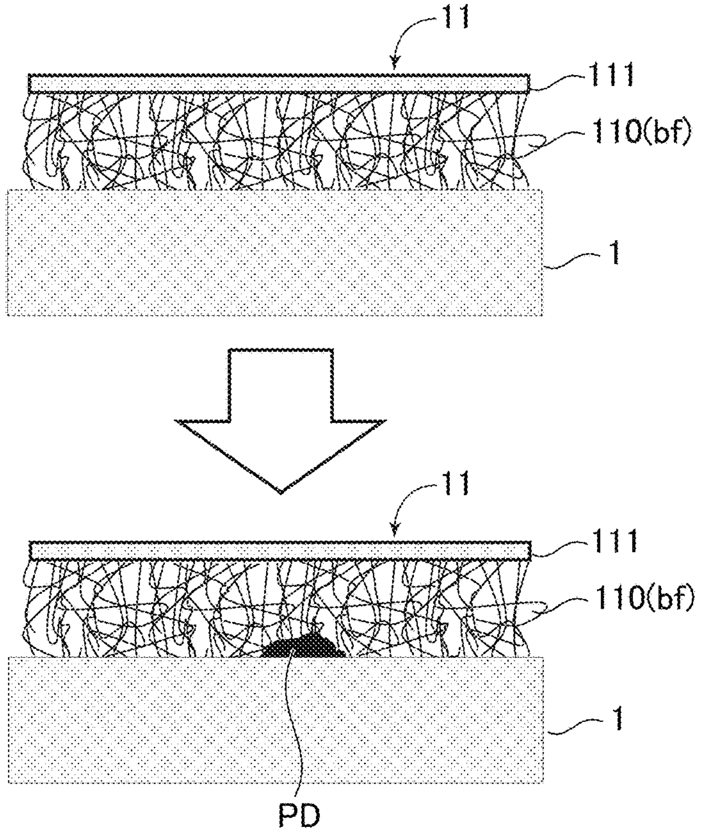
FIG. 5B is a view illustrating a behavior of a case where paper dust is accumulated in the brush member according to the first embodiment.

Meanwhile, according to the present embodiment, crimped yarn is used as brush filaments, such that as illustrated in FIG. 5B, the brush filaments bf will not be easily pushed apart by the accumulated paper dust PD, and filament bundle splitting is less likely to occur. Therefore, even if the accumulated number of passed sheets increases, harmful effects such as charging failures caused by the leakage of paper dust from the filament bundle splitting range are less likely to occur. That is, according to the present embodiment, an image forming apparatus in which leakage of paper dust is less likely to occur may be provided.

The paper dust PD that may cause charging failures and image defects described above is a paper dust with a length of approximately 100 μm or more. Further, the paper dust PD is not limited to that composed of only filament bits of sheet S but also of an aggregate of filament bits and other foreign substances, such as additive of toner or filler of sheet S. According to the present embodiment, such leakage of paper dust PD is reduced, and therefore, the possibility of charging failures and image defects may also be reduced.

Parameters α and β of the brush member 11 will be escribed as a more preferable configuration of the brush member 11 according to the present embodiment.

The values of parameters α and β are values that are determined by the following descriptions based on the brush filaments bf within a range of a unit area, i.e., 1 mm square, hereinafter referred to as unit range, of the base body 111.

α: Value obtained by averaging maximum values of $f(x)$ for each brush filaments bf for all the brush filaments bf within the unit range.

β: Value determined by the following equation based on a filament density ρ of the brush filaments bf (number of filaments/mm$^2$) in the unit range.

$$\beta=\left(\frac{\sqrt{3}\rho}{8}\right)^{-\frac{1}{z}}$$

Figure 4A:
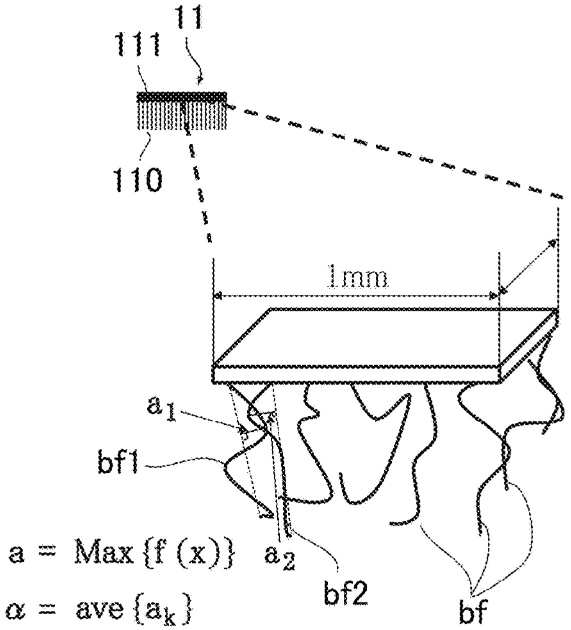
FIGS. 4A and 4B are each a view illustrating a parameter of the brush member.

The meaning of parameter a will be described with reference to FIG. 4A. Regarding each brush filament bf, a maximum value a_k of $f(x)$ refers to how much an intermediate part between both end points of the brush filament bf is deviated from a straight line connecting the both end points. That is, the maximum value a_k of $f(x)$ indicates a level of crimping of the brush filament bf, that is, the intensity of the curve, or level of spreading of one brush filament bf. The maximum value of $f(x)$ of a brush filament bf1 in the drawing is a_1, and the maximum value of $f(x)$ of a brush filament bf2 is a_2.

Since a is an average value ave(a_k) of the maximum value a_k of $f(x)$, it represents an average level of crimping of the brush filaments bf within the unit range. In other words, it means that as the value of α increases, there are more brush filaments bf that are crimped in a manner greatly deviated in a direction orthogonal to the height direction of the filament portion 110, i.e., normal direction of the base body 111.

Figure 4B:
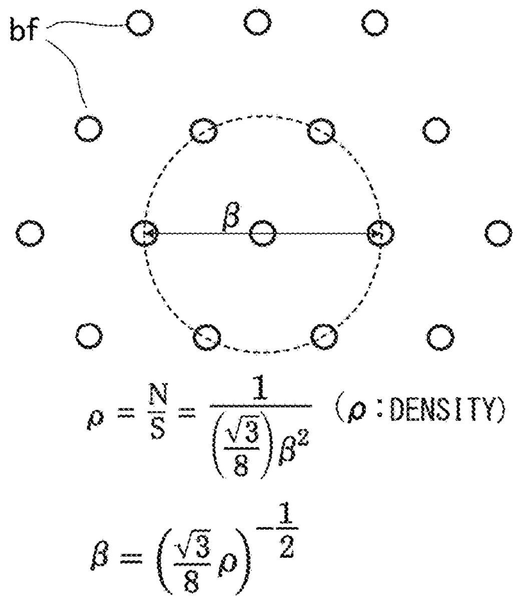

The meaning of parameter β will be described with reference to FIG. 4B. β represents an amount in which the filament density ρ of the brush filaments bf is set as variable. The filament density ρ is given by a ratio (N/S) of a number of brush filaments bf (N) per unit area (S). When it is assumed that tips of the brush filaments bf are disposed in a hexagonal arrangement, which is the closest packing in two dimensional arrangement, in a state where a certain brush filament bf is set as center, β represents a diameter of a circumference passing another brush filament bf that is most adjacent to the brush filament bf.

As the ratio of the value of $\alpha$ to the value of $\beta$ increases, the level of crimping of the individual brush filaments bf are increased with respect to an average distance between adjacent brush filaments bf, such that the adjacent brush filaments bf are easily entangled with each other. Therefore, in the present embodiment, it is preferable that $\alpha>\beta$ is satisfied. Further, by satisfying $\alpha>2\beta$, the brush filaments bf will be more easily entangled with each other.

Paper Dust Collection Test

Results of a paper dust collection test performed to confirm the advantages of the present embodiment will be described. The test was performed using the image forming apparatus 100 having brush members 11 according to examples 1 to 4 illustrated in Table 1 attached thereto. The configurations other than the brush member 11 are according to the embodiment described above and are common among examples 1 to 4.

TABLE 1

| TEST BRUSH | FILAMENT DENSITY (kF/inch^2) | CRIMPING TREATMENT | α(μm) | β(μm) | MAGNITUDE OF α AND β |
|---|---|---|---|---|---|
| EXAMPLE 1 | 120 | N | 74 | 158 | α < β |
| EXAMPLE 2 | 120 | Y | 104 | 158 | α < β |
| EXAMPLE 3 | 360 | N | 70 | 91 | α < β |
| EXAMPLE 4 | 120 | Y | 366 | 158 | α > β |

When the brush member 11 is created using pile fabric, for example, a plurality of brush filaments bf may be arranged in a grouped manner at one spot on the base body 111. Specifically, filament yarn having bundled together a plurality of filaments is used as pile yarn, and loops of the pile yarn are cut, by which a plurality of brush filaments bf are supported in a grouped manner at one spot on the base body 111. In this case, the brush filaments bf are sparse in some places and dense in other places near the base body 111, that is, at the root of the filament portion 110, but the distances between the brush filaments bf are widened toward the tip of the filament portion 110 away from the base body 111, and the distribution thereof becomes more uniform. Therefore, even according to the arrangement described above, the plane distribution of the brush filaments bf are considered to satisfy a hexagonal arrangement. That is, even if the brush filaments bf are sparse in some places and dense in other places near the base body 111, as the ratio of value $\alpha$ to the value $\beta$ increases, the adjacent brush filaments bf are easily entangled with each other, similar to the aforementioned arrangement.

In order to obtain the value of parameter $\alpha$, the brush filaments bf within a unit range are cut at the boundary between the base body 111 and the filament portion 110 and collected, and thereafter, observed using a microscope, for example. Further, since the shape of the brush filament bf may be varied gradually by sliding against the photosensitive drum 1, the observation of the brush filaments bf is performed in a state where the image forming apparatus 100 is new.

When the relationship of $\alpha>\beta$ is satisfied, the entanglement between the brush filaments bf becomes stronger, and even when paper dusts are accumulated in the brush member 11, filament bundle splitting is less likely to occur. Therefore, even if the accumulated number of passed sheets increases, harmful effects such as charging failure caused by leakage of paper dust from the filament bundle splitting range is less likely to occur.

The unit range that satisfies the relationship of $\alpha>\beta$ may be present at least at a part of the brush member 11, but it is preferable that $\alpha>\beta$ is satisfied in the entire maximum sheet passing range described earlier.

According to the adopted testing method, test images were formed to test sheets, and the number of occurrences of image defects was counted with respect to the accumulated number of passed sheets. Xerox Vitality Multipurpose Printer Paper (Tradename) having a grammage of 75 g/m$^2$, which is a product of Xerox Corporation, was used as the test sheet. The test image was a lateral pattern image in which a lateral line, which is a straight line that extends in a width direction orthogonal to a conveyance direction of the sheet S throughout the entire effective printing range, having a width of 0.254 mm and a blank having a width of 25.146 mm are repeatedly formed. Image defects refer to periodic, lateral black strip-like images, as illustrated in FIG. 6.

Figure 6:
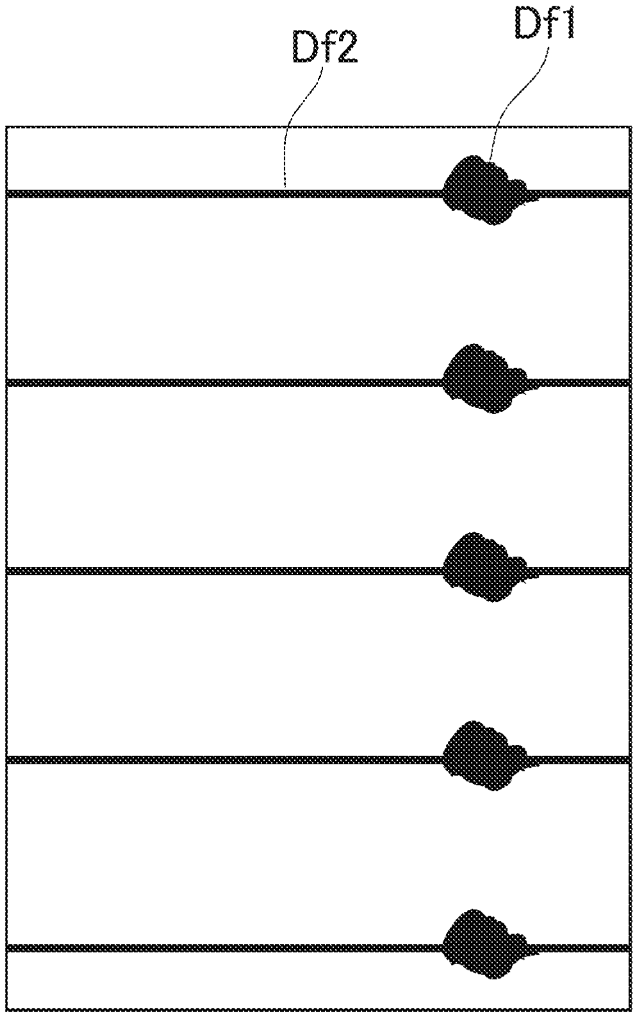
FIG. 6 is a view illustrating an example of an image defect in a paper dust collection test.

Image defects as that illustrated in FIG. 6 occur by lump of paper dust slipping past the brush contact portion due to filament bundle splitting of the brush member 11. In this case, the lump of paper dust having slipped through the brush contact portion and reaching the charging portion adheres to the charging roller 2, and a gap is formed between the charging roller 2 and the photosensitive drum 1 by the adhered lump of paper dust. Due to this gap, charging failure occurs to the surface of the photosensitive drum 1 periodically corresponding to the rotation period of the charging roller 2. Since a reversal development system is adopted according to the present embodiment, images Df1 and Df2 are developed at the charging failure range, such that image defects as those illustrated in FIG. 6 occur. In FIG. 6, a lump-like image Df1 corresponds to the charging failure range that is generated around the lump of paper dust adhered to the charging roller 2, and a lateral line-like image Df2 corresponds to the charging failure region that is generated by the gap formed by the lump of paper dust adhered to the charging roller 2. As described, by using a lateral line pattern image as test image and observing characteristic image defects that occur by adhesion of paper dust to the charging roller 2, the paper dust collection ability of the brush member 11 may be evaluated. Table 2 illustrates results of the accumulated numbers of occurrence of image defects that have been summed up every 10,000 accumulated number of passed sheets using the respective test brushes.

TABLE 2

| ACCUMULATED NUMBER OF OCCURRENCE OF IMAGE FAILURE | | | |
|---|---|---|---|
| | ACCUMULATED NUMBER OF PASSED SHEETS | | |
| TEST BRUSH | 10,000 | 20,000 | 30,000 |
| EXAMPLE 1 | 2 | 6 | 11 |
| EXAMPLE 2 | 0 | 3 | 10 |
| EXAMPLE 3 | 0 | 1 | 3 |
| EXAMPLE 4 | 0 | 0 | 0 |

As illustrated in Table 1, examples 1 and 2 of the brush member 11 differ in that the former uses filaments not subjected to crimping treatment, i.e., non-crimped yarn, and the latter uses filaments that have been subjected to crimping treatment, i.e., crimped yarn, as the brush filaments bf. As illustrated in Table 2, by comparing examples 1 and 2, in example 2 in which crimped yarn is used as the brush filaments bf, the occurrence of image defects was reduced compared to example 1 where non-crimped yarn was used as the brush filaments bf. Specifically, in example 1, image defects had occurred when the accumulated number of passed sheets reached 10,000 sheets, whereas in example 2, no image defects had occurred when the accumulated number of passed sheets reached 10,000 sheets. That is, in example 2, the brush filaments bf have been subjected to crimping treatment, such that the brush filaments bf are easily entangled with each other, and filament bundle splitting (FIG. 5A) caused by the paper dust PD accumulated in the brush member 11 splitting the brush filaments bf was less likely to occur.

However, according to example 2, image defects occurred when the accumulated number of passed sheets was between 10,000 and 20,000 sheets, and after the number exceeded 20,000 sheets, generation frequency of image defects was increased. This is because the level of crimping of the brush filaments bf is relatively small and the strength of entanglement of the brush filaments bf is relatively weak, such that filament bundle splitting could not be suppressed sufficiently as the amount of paper dust accumulated in the brush member 11 increased.

As illustrated in Table 1, examples 2 and 4 of the brush member 11 both used crimped yarn as the brush filaments bf, but they differ in that $\alpha>\beta$ is satisfied in example 4 whereas $\alpha<\beta$ is satisfied in example 2. As illustrated in Table 2, when comparing examples 2 and 4, compared to example 2 satisfying $\alpha<\beta$, example 4 satisfying $\alpha>\beta$ could sufficiently reduce the occurrence of image defects even when the accumulated number of passed sheets was increased. This is because according to example 4, due to the relationship of $\alpha>\beta$, the brush filaments bf were more firmly entangled with each other, such that even when a large amount of paper dust PD was accumulated in the brush member 11, filament bundle splitting (FIG. 5A) caused by the brush filaments bf being pushed apart is even less likely to occur. Therefore, by using crimped yarn as the brush filaments bf and satisfying the relationship of $\alpha>\beta$, a stable paper dust collection ability may be realized for a long period of time.

As a reference example, in example 3, non-crimped yarn was used as the brush filaments bf, and the density of brush filaments was set higher, i.e., to 360 kF/inch$^2$, than other examples. As illustrated in Table 2, in example 3, the generation frequency of image defects was reduced compared to examples 1 and 2. This is because even if the flexural rigidity of individual brush filaments bf was the same as examples 1 and 2, the number of brush filaments bf that the lump of paper dust must push apart to slip through the brush contact portion was increased, such that filament bundle splitting was less likely to occur, and as a result, the lump of paper dust was less likely to be discharged from the brush member 11. However, according to example 3, the generation frequency of image defects was increased along with the increase of the accumulated number of passed sheets. This is considered to be caused by the fact that since the brush filaments bf are not entangled with each other, when the amount of paper dust accumulated in the brush member 11 increases, filament bundle splitting still occurs, and the lump of paper dust is discharged as a result.

In example 4, the generation frequency of image defects was even smaller than example 3. That is, by using crimped yarn as the brush filaments bf, a preferable paper dust collection property was realized, even though the filament density of the brush filaments bf was low. This means that by using crimped yarn and satisfying $\alpha>\beta$ as the brush filaments bf as in example 4, a good paper dust collection property may be realized while setting the density of the brush filaments bf to a value enabling toner to easily pass through the brush contact portion. Specifically, in the image forming apparatus adopting a cleanerless system, an advantage of improving the collection efficiency of transfer residual toner at the developing portion may be achieved by allowing toner to easily pass through the brush contact portion.

The filament density of the brush filaments bf should preferably be set to a value that allows toner to pass therethrough, such as equal to or less than 200 kF/inch$^2$. If the filament density is higher than this value, transfer residual toner may not pass through the brush contact portion, and a drawback may occur, such as the blocked toner being scattered and contaminating the interior of the image forming apparatus 100. Further, if the filament density is higher than this value, toner being blocked by the filament portion 110 may be discharged onto a potential changing portion on the photosensitive drum 1, and the discharged toner may be transferred via the photosensitive drum 1 onto the sheet S, by which toner soiling of the sheet may occur.

The potential changing portion of the photosensitive drum 1 refers to the portion where a surface potential of the photosensitive drum 1 changes in a stepwise manner, which is formed when a trailing edge of the sheet S passes through a transfer portion, for example. That is, a surface range of the photosensitive drum 1 that has been in contact with the sheet S at the transfer portion is referred to as a contact range, and a surface range of the photosensitive drum 1 that is adjacent to the contact range in the direction of rotation of the photosensitive drum 1 and that has not been in contact with the sheet S at the transfer portion is referred to as a noncontact range. When the trailing edge of the sheet S passes through the transfer portion, transfer current concentrates to the noncontact range that is directly opposed to the transfer roller 5 without interposing the sheet S, compared to the contact range that opposes the transfer roller 5 with the sheet S serving as a resistance interposed therebetween. As a result, a potential changing portion is formed at a boundary portion between the contact range and the noncontact range on the photosensitive drum 1. The potential changing portion is an area where the potential of the noncontact range changes significantly toward the same polarity as the transfer voltage, which according to the present embodiment is the positive polarity, with respect to the potential of the contact range. When the potential changing portion on the photosensitive drum 1 passes the brush member 11 in a state where toner is accumulated in the brush member 11, toner is attracted toward the potential changing portion by electrostatic force, by which a large amount of toner is discharged from the brush member 11, possibly causing toner soiling of the sheet.

Further, if the filament density is too low, the paper dust collecting ability is reduced, such that the filament density of the brush filaments bf should preferably be set to 40 kF/inch$^2$ or more, for example. The filament density may be changed as needed, since the paper dust collecting ability and toner passing property may also vary according to conditions other than filament density, such as the level of crimping of the brush filaments bf, the thickness of the brush filaments bf, and the inroad amount of the brush member 11 to the photosensitive drum 1.

Brush members 11 each using filaments having the same level of crimping as example 4 and having the filament density changed into three levels, which are 120, 200, and 240 kF/inch$^2$, are respectively referred to as example 4, example 5, and example 6. In other words, examples 4 to 6 respectively satisfy a relationship of $\alpha>\beta$, wherein $\alpha$ is 366 μm, and $\beta$ is respectively set to 158 μm, 122 μm, and 112 μm. Results having evaluated whether toner soiling has occurred to the sheet when the respective brush members 11 of examples 4 to 6 have been used are illustrated in Table 3. Evaluation tests were performed by forming images, which are the same lateral line pattern images as the test image adopted in the test of Table 1, to 30,000 sheets using the image forming apparatus 100 equipped with the brush member 11 according to the respective examples, and thereafter, forming solid white images to two sheets S. If there was toner soiling near the upper edge portion of the second sheet S of the two sheets S on which solid white images were formed, the toner soiling of the sheet was evaluated as "Y", and if there was no toner soiling near the upper edge portion of the second sheet S, the toner soiling of the sheet was evaluated as "N". This test method was performed with the aim to reproduce a state in which toner soiling of the sheet may relatively easily occur.

TABLE 3

| TEST BRUSH | MAGNITUDE OF α AND β | FILAMENT DENSITY (kF/inch^2) | TONER SOILING OF SHEET |
|---|---|---|---|
| EXAMPLE 4 | $\alpha > \beta$ | 120 | N |
| EXAMPLE 5 | $\alpha > \beta$ | 200 | N |
| EXAMPLE 6 | $\alpha > \beta$ | 240 | Y |

As described above, according to example 6 in which the filament density was 240 kF/inch$^2$, toner soiling of the sheet occurred. In example 6, the filament density of the brush member 11 is high, such that toner being blocked by the brush member 11 was discharged onto the potential changing portion on the photosensitive drum 1 that has been formed when the trailing edge of the first sheet S on which a solid white image had been formed passes through the transfer portion. Then, the toner having been discharged onto the photosensitive drum 1 is considered to have been attached to the area near the upper edge portion of the second sheet S as toner soiling of the sheet. Meanwhile, in examples 4 and 5 in which the filament density was 120 kF/inch$^2$ and 200 kF/inch$^2$, respectively, toner soiling of the sheet did not occur. Therefore, toner soiling of the sheet may be reduced if the filament density is 200 kF/inch$^2$ or less.

As described above, according to the present embodiment, a brush member using crimped yarn as the brush filaments bf was used, such that the brush filaments bf are entangled with each other, and the possibility of leakage of lump of paper dust in a manner pushing apart the brush filaments bf may be reduced. Thus, the possibility of charging failure by leakage of paper dusts and image defects caused thereby may be reduced.

Second Embodiment

A second embodiment will be described. The present embodiment differs from the first embodiment in that the brush member 11 is arranged in an inclined manner with respect to the photosensitive drum 1, and the configurations other than the brush member 11 of the image forming apparatus 100 are basically the same as the first embodiment. In the following description, unless denoted otherwise, the elements assigned with the same reference numbers as the first embodiment adopt the same configurations and functions as those described in the first embodiment, such that only the portions that differ from the first embodiment will mainly be described.

Figure 7:
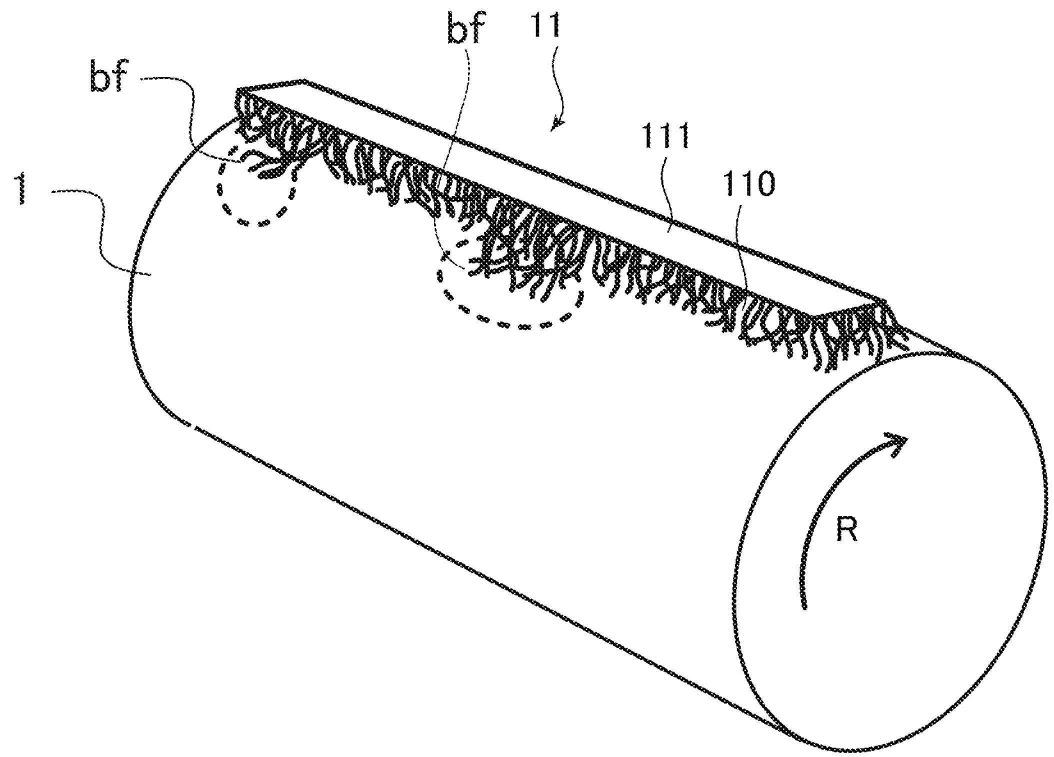
FIG. 7 is a view illustrating a state of filament bundle splitting at an upstream end of the brush member.

In the first embodiment, crimped yarn was used as the brush filaments bf, such that the adjacent brush filaments bf in the filament portion 110 were entangled with each other. However, the brush filaments bf positioned at the upstream end of the brush member 11 in the direction of rotation of the photosensitive drum 1 do not have any brush filaments bf arranged adjacent thereto on the upstream side thereof. Therefore, as illustrated in FIG. 7, parts of the brush filaments bf positioned on the upstream end of the brush member 11 may be subjected to filament bundle splitting in a manner protruding to the upstream side in a direction of rotation R, the parts being denoted as areas surrounded by dashed lines in the drawing.

The brush filaments bf protruded to the upstream side may not be in sufficient contact with the photosensitive drum 1 and may not be contact at all with the photosensitive drum 1. Therefore, paper dust tends to be accumulated in the area where filament bundle splitting has occurred, as illustrated in FIG. 7. Even according to this example, the brush filaments bf arranged downstream of the brush filaments bf protruded to the upstream side in the area where filament bundle splitting has occurred are entangled with each other, such that paper dust may be blocked from leaking out. However, when the accumulated amount of paper dust is increased, or if a large amount of paper dust adheres to the photosensitive drum 1 in a short time, the brush filaments bf disposed downstream thereof may give way and cause the lump of paper dust to leak out, such that image defects due to adhesion of paper dust on the charging roller 2 may occur.

According to the present embodiment, a configuration capable of reducing filament bundle splitting at the upstream end of the brush member 11 may be proposed.

Figure 8:
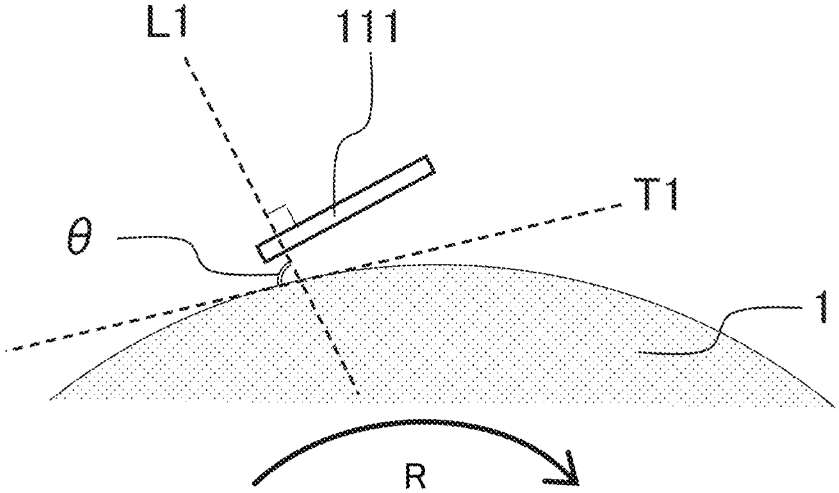
FIG. 8 is a schematic diagram illustrating a configuration of a brush member according to a second embodiment.

The configuration of the brush member 11 according to the present embodiment will be described with reference to FIG. 8. FIG. 8 is a schematic diagram illustrating a positional relationship of the base body 111 of the brush member 11 to the photosensitive drum 1 when the photosensitive drum 1 is viewed in the rotational axis direction, i.e., the longitudinal direction of the brush member 11.

In FIG. 8, a virtual straight line that passes an upstream end of a supporting range for the filament portion 110 in the direction of rotation R of the photosensitive drum 1 and that is perpendicular to the base body 111 is denoted as a line L1. The supporting range is a range in the direction of rotation R in which the base body 111 supports the filament portion 110. A tangential line on the surface of the photosensitive drum 1 at an intersection between the line L1 and the surface of the photosensitive drum 1 is denoted as a tangential line T1.

In the present embodiment, the brush member 11 is arranged such that an angle θ between the line L1 and the tangential line T1 upstream in the direction of rotation R of the photosensitive drum 1 with respect to the line L1 and on an opposite side from the photosensitive drum 1 of the tangential line T1 is an acute angle. That is, $0° < \theta < 90°$. In other words, the brush member 11 is arranged in an inclined manner such that the distance between the base body 111 and the tangential line T1 in the direction of the line L1 widens toward the downstream side in the direction of rotation R of the photosensitive drum 1. That is, according to the present embodiment, the brush member 11 is inclined with respect to the tangential line T1, i.e., second line, such that the distance between the base body 111 and the tangential line T1, i.e., second line, in the direction of the line L1, i.e., first line, widens toward the downstream side in the direction of rotation of the image bearing member.

According to this configuration, the brush filaments bf positioned on the upstream end of the brush member 11 are easily drawn in toward the downstream side by the rotation of the photosensitive drum 1. Therefore, filament bundle splitting in a manner where the brush filaments bf protrude upstream is less likely to occur at the upstream end of the brush member 11, such that the leakage of lump of paper dusts and the occurrence of charging failures and image defects accompanying the same at the area where filament bundle splitting has occurred may be reduced.

In the present embodiment, a configuration in which the bundles splitting of brush filament bf, i.e., filament bundle splitting toward the upstream side in the direction of rotation R of the photosensitive drum 1, is reduced by the inclined arrangement of the brush member 11, but it is also possible to reduce filament bundle splitting of the brush filaments bf by other configurations. For example, a similar effect as the present embodiment may be obtained by preforming the brush filaments bf such that the tips of the brush filaments bf are oriented toward the downstream side in the direction of rotation R of the photosensitive drum 1 in the attached state before attaching the brush member 11 to the supporting member.

Modifications

In the respective embodiments described above, a configuration of a direct transfer system in which toner image is directly transferred from the photosensitive drum 1, i.e., image bearing member, to a sheet, i.e., recording material, serving as the transfer material has been illustrated, but the present technique may also be applied to an image forming apparatus adopting an intermediate transfer system. In the case of an intermediate transfer system, a transfer unit refers, for example, to a transfer roller, i.e., primary transfer roller, by which transfer image is primarily transferred from the photosensitive drum 1 serving as an image bearing member to an intermediate transfer body serving as a transfer material. An endless belt member stretched over a plurality of rollers may be used as the intermediate transfer body. The toner image having been primarily transferred to the intermediate transfer body is secondarily transferred via a secondary transfer unit, such as a secondary transfer roller that forms a secondary transfer nip portion with the intermediate transfer body, from the intermediate transfer body to the sheet, i.e., recording material. Even according to a configuration adopting such an intermediate transfer system, a similar effect as the present embodiment may be achieved by replacing the transfer roller of the above-mentioned embodiments with the primary transfer roller.

According to the present disclosure, an image forming apparatus in which leakage of paper dust from the brush member is less likely to occur may be provided.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2023-080309, filed on May 15, 2023, and 2024-064248, filed on Apr. 11, 2024, which are hereby incorporated by reference herein in their entirety.

What is claimed is:

1. An image forming apparatus comprising:

an image bearing member configured to rotate;

a charging unit configured to charge the image bearing member at a charging portion;

a developing unit configured to develop an electrostatic latent image formed on the image bearing member into a toner image using toner at a developing portion;

a transfer unit configured to transfer the toner image to a transfer material at a transfer portion; and a brush member arranged to be in contact with the image bearing member at a position downstream of the transfer portion and upstream of the charging portion in a direction of rotation of the image bearing member, wherein the image forming apparatus is configured such that residual toner that has not been transferred to the transfer material at the transfer portion is collected by the developing unit at the developing portion, wherein the brush member includes a base body and a filament portion that is supported by the base body and that is configured to come into contact with the image bearing member, wherein 50% or more of filaments of the filament portion are crimped yarn, and wherein the filaments of the crimped yarn are arranged in a dispersed manner over an entire range of the filament portion in the direction of rotation of the image bearing member.

2. The image forming apparatus according to claim 1, wherein, in a case where:

(i) one of end points of a curved line obtained by subjecting a filament of the filament portion to parallel projection from a predetermined direction is referred to as a starting point of the curved line, (ii) a length measured from the starting point to an arbitrary point p on the curved line along the curved line is referred to as variable x, (iii) a distance between the point p and a straight line connecting both end points of the curved line is referred to as function $f(x)$ of x, (iv) α (mm) represents an average of maximum values of the function $f(x)$ for each filament of the filament portion for all the filaments arranged within a range of a unit area of the base body, and (v) β represents a value determined by a following equation based on a filament density ρ (number of filaments/$mm^2$) of the filament portion in the range of the unit area, $$\beta=\left(\frac{\sqrt{3}\rho}{8}\right)^{-\frac{1}{2}}$$

α>β is satisfied.

3. The image forming apparatus according to claim 1, wherein, when viewed in a rotational axis direction of the image bearing member and in a case where (vi) a virtual straight line that passes an upstream end of a supporting range of the base body in the direction of rotation of the image bearing member and that is perpendicular to the base body is referred to as a first line, (vii) the supporting range is a range in which the base body supports the filament portion, and (viii) a tangential line of a surface of the image bearing member at an intersection between the first line and a surface of the image bearing member is referred to as a second line, the brush member is inclined with respect to the second line such that a distance between the base body and the second line in a direction of the first line is widened toward a downstream side in the direction of rotation.

4. The image forming apparatus according to claim 1, wherein a filament density of the filament portion is 40 kF/inch$^2$ or more and 200 kF/inch$^2$ or less.

5. The image forming apparatus according to claim 1, wherein the brush member includes a pile fabric, and the filament portion is formed of pile yarn of the pile fabric.

6. The image forming apparatus according to claim 1, further comprising:

a voltage applying portion configured to apply a voltage having a same polarity as a normal polarity of the toner to the brush member.

7. The image forming apparatus according to claim 1, wherein the transfer material is a recording material.

8. The image forming apparatus according to claim 1, wherein the transfer material is an intermediate transfer body, and wherein the image forming apparatus further comprises a secondary transfer unit configured to transfer the toner image having been transferred to the intermediate transfer body to a recording material.

9. An image forming apparatus comprising:

an image bearing member configured to rotate;

a charging unit configured to charge the image bearing member at a charging portion;

a developing unit configured to develop an electrostatic latent image formed on the image bearing member into a toner image using toner at a developing portion;

a transfer unit configured to transfer the toner image to a transfer material at a transfer portion; and a brush member arranged to be in contact with the image bearing member at a position downstream of the transfer portion and upstream of the charging portion in a direction of rotation of the image bearing member, wherein the image forming apparatus is configured such that residual toner that has not been transferred to the transfer material at the transfer portion is collected by the developing unit at the developing portion, wherein the brush member includes a base body, and a filament portion that is supported by the base body and that is configured to come into contact with the image bearing member, wherein in a case where:

(i) one of end points of a curved line obtained by subjecting a filament of the filament portion to parallel projection from a predetermined direction is referred to as a starting point of the curved line, (ii) a length measured from the starting point to an arbitrary point p on the curved line along the curved line is referred to as variable x, and (iii) a distance between the point p and a straight line connecting both end points of the curved line is referred to as function $f(x)$ of x, 50% or more of filaments of the filament portion are each a filament of which the function $f(x)$ has an inflection point, and are arranged in a dispersed manner over an entire range of the filament portion in the direction of rotation of the image bearing member.

10. The image forming apparatus according to claim 9, wherein in a case where:

(iv) α (mm) represents an average of maximum values of the function $f(x)$ for each filament of the filament portion for all the filaments arranged within a range of a unit area of the base body, and (v) β represents a value determined by a following equation based on a filament density ρ (number of filaments/mm$^2$) of the filament portion in the range of the unit area, $$\beta=\left(\frac{\sqrt{3}\rho}{8}\right)^{-\frac{1}{2}}$$

α>β is satisfied.

11. The image forming apparatus according to claim 9, wherein when viewed in a rotational axis direction of the image bearing member and in a case where (vi) a virtual straight line that passes an upstream end of a supporting range of the base body in the direction of rotation of the image bearing member and that is perpendicular to the base body is referred to as a first line, (vii) the supporting range is a range in which the base body supports the filament portion, and (viii) a tangential line of a surface of the image bearing member at an intersection between the first line and a surface of the image bearing member is referred to as a second line, the brush member is inclined with respect to the second line such that a distance between the base body and the second line in a direction of the first line is widened toward a downstream side in the direction of rotation.

12. The image forming apparatus according to claim 9, wherein a filament density of the filament portion is 40 kF/inch$^2$ or more and 200 kF/inch$^2$ or less.

13. The image forming apparatus according to claim 9, wherein the brush member includes a pile fabric, and the filament portion is formed of pile yarn of the pile fabric.

14. The image forming apparatus according to claim 9, further comprising:

a voltage applying portion configured to apply a voltage having a same polarity as a normal polarity of the toner to the brush member.

15. The image forming apparatus according to claim 9, wherein the transfer material is a recording material.

16. The image forming apparatus according to claim 9, wherein the transfer material is an intermediate transfer body, and wherein the image forming apparatus further comprises a secondary transfer unit configured to transfer the toner image having been transferred to the intermediate transfer body to a recording material.

* * * * *